(12) United States Patent
Dobele

(10) Patent No.: US 9,255,823 B2
(45) Date of Patent: Feb. 9, 2016

(54) METALLIC SENSOR HOUSING AND METHOD FOR MANUFACTURE OF SAME

(71) Applicant: SICK AG, Waldkirch/Breisgau (DE)

(72) Inventor: Christian Dobele, Kenzingen (DE)

(73) Assignee: Sick AG, Waldkirch/Breisgau (DE)

( * ) Notice: Subject to any disclaimer, the term of this patent is extended or adjusted under 35 U.S.C. 154(b) by 193 days.

(21) Appl. No.: 13/893,540

(22) Filed: May 14, 2013

(65) Prior Publication Data
US 2013/0305821 A1 Nov. 21, 2013

(30) Foreign Application Priority Data

May 18, 2012 (EP) .................... 12168526

(51) Int. Cl.
G01D 11/24 (2006.01)
(52) U.S. Cl.
CPC .................... *G01D 11/245* (2013.01)
(58) Field of Classification Search
CPC ........................................ G01D 11/24
USPC ............................................ 73/431
See application file for complete search history.

(56) References Cited

U.S. PATENT DOCUMENTS

| 4,117,300 A | 9/1978 | Ricards |
| 2002/0018609 A1* | 2/2002 | Schumann ............... 385/12 |
| 2003/0001083 A1* | 1/2003 | Corrado et al. .......... 250/239 |
| 2008/0165517 A1 | 7/2008 | Wang et al. |
| 2009/0099529 A1* | 4/2009 | Anderson et al. ........ 604/192 |
| 2011/0084579 A1 | 4/2011 | Chang |
| 2011/0185812 A1* | 8/2011 | Raschke .................. 73/431 |

FOREIGN PATENT DOCUMENTS

| DE | 195 19 817 A1 | 12/1996 |
| DE | 101 47 023 A1 | 4/2003 |
| DE | 103 13 643 A1 | 11/2004 |
| DE | 202009015786 U1 * | 5/2011 |
| DE | 10 2010 001 493 A1 | 8/2011 |
| JP | S53 1152 A | 1/1978 |
| JP | 2006043768 A | 2/2006 |

OTHER PUBLICATIONS

European Search Report, Application No. EP 12 16 8526, dated Nov. 20, 2012, three (3) pages.

* cited by examiner

*Primary Examiner* — Lisa Caputo
*Assistant Examiner* — Jamel Williams
(74) *Attorney, Agent, or Firm* — Nath, Goldberg & Meyer; Jerald L. Meyer; Rury L. Grisham

(57) ABSTRACT

The invention relates to a metallic sensor housing for an optoelectronic sensor which is composed of a plurality of parts. Provision is made in accordance with the invention that two or more metallic parts of the housing are connected to one another with material continuity. The invention additionally relates to an optoelectronic sensor having a metallic sensor housing in accordance with the invention and to a method of manufacturing a metallic sensor housing in accordance with the invention.

3 Claims, 6 Drawing Sheets

Figure 1:
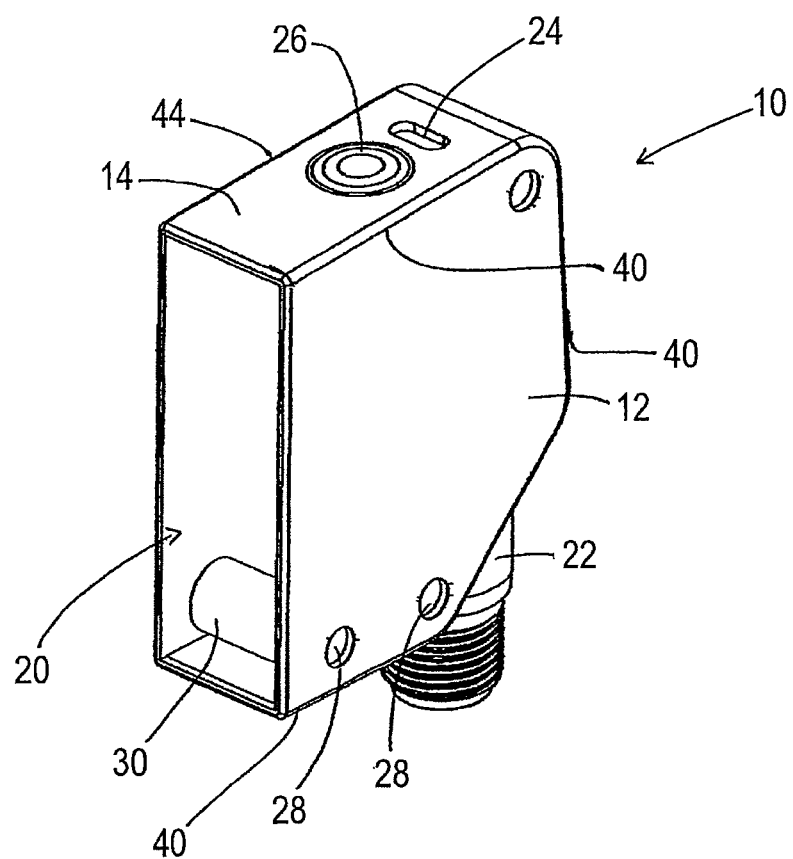

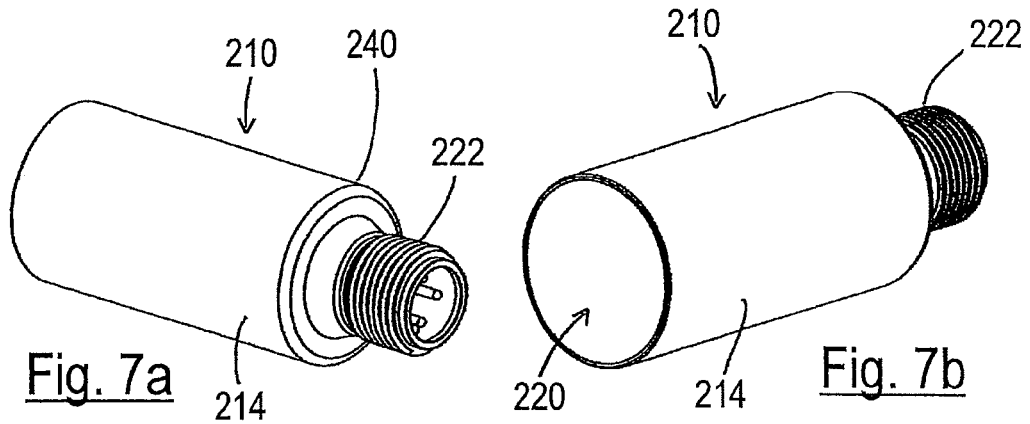
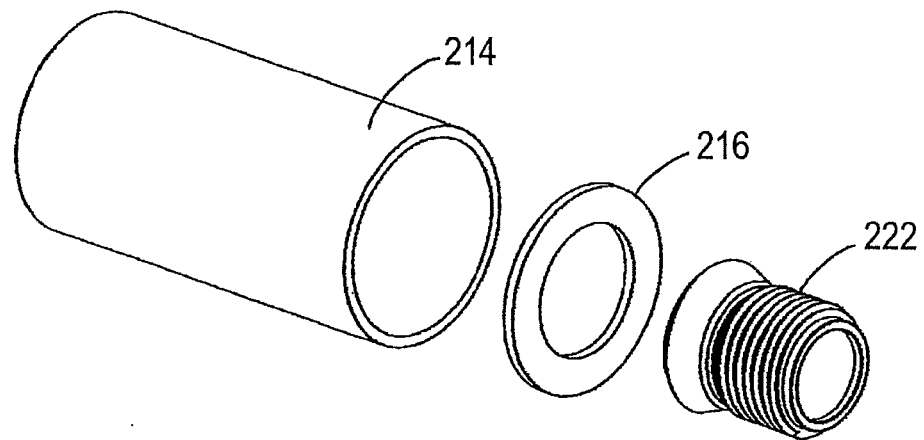
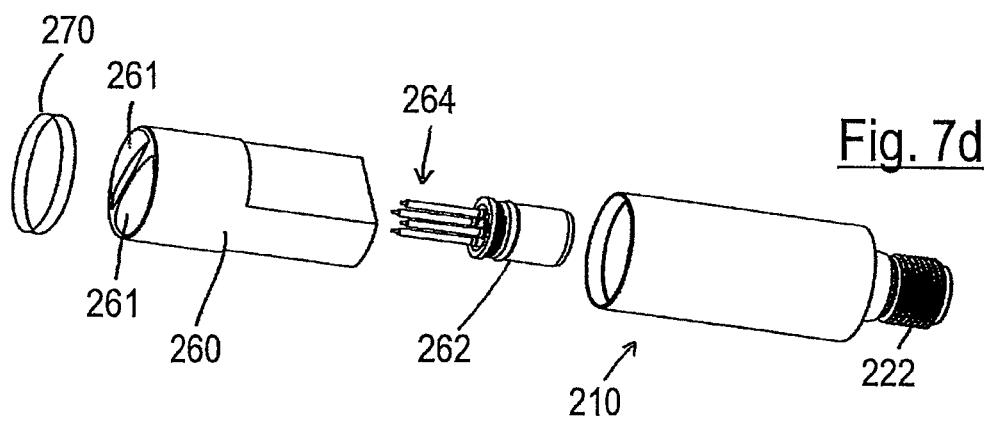

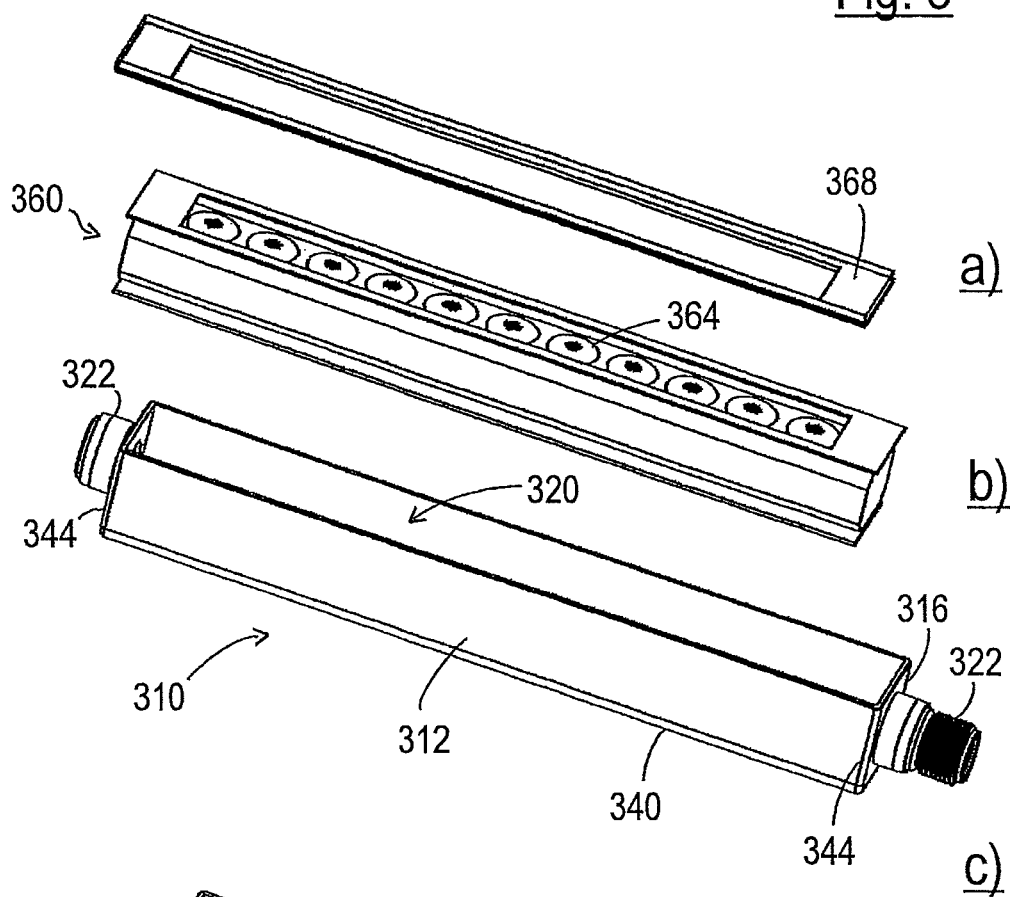
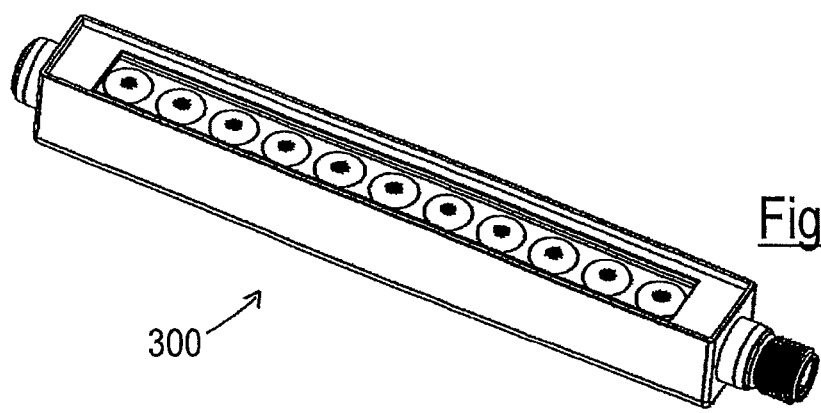

METALLIC SENSOR HOUSING AND METHOD FOR MANUFACTURE OF SAME

The invention relates to a metallic sensor housing for an optoelectronic sensor which is composed of a plurality of parts. The invention furthermore relates to an optoelectronic sensor comprising such a sensor housing and to a method of manufacturing such a metallic sensor housing.

Optoelectronic sensors frequently comprise high-alloyed stainless steel outer housings for the protection of the sensor to protect them against rough environmental conditions. High chemical resistance e.g. to acids and lyes and mechanical robustness are thus necessary in many cases. Many optoelectronic sensors are used under extreme conditions so that they have e.g. to withstand thermal demands such as fast and large temperature changes.

Other optoelectronic sensors have to have high humidity resistance and optionally e.g. withstand vapor jets of high pressure.

An easy cleaning possibility, e.g. washability, is also important in some applications.

Finally, optoelectronic sensors have to satisfy high hygienic demands in many applications.

Sensor housings of stainless steel are today e.g. manufactured in the lost wax process. In this process, a melt is cast into "lost molds". There is, however, the risk here that the parts deform by undefined solidifying of the melt during the casting. Inhomogeneous surfaces frequently arise with streaks, flow lines and pressure marks of the mold. To seal microleaks in the component, additional impregnation is necessary in many cases. A smooth surface which satisfies high hygienic demands can frequently only be achieved by grinding or flycutting. In addition, the los wax process is not suitable for manufacturing large-volume parts with small wall thicknesses. Finally, the production precision is not very high.

In particular with small sensor housings with small wall thicknesses in relation to the length extension, the process of powder injection molding (metal injection molding, MIM) is frequently used. A metal powder provided with a binder is here processed in injection molding and the binder is subsequently removed. The housing is then sintered. It is thus possible to manufacture parts of complex shape in larger volumes with relatively small tolerances. A better surface quality can be achieved using MIM technology than in the lost wax technique, also without reworking.

However, large-volume parts with small wall thicknesses can only be manufactured with difficulty or at all using MIM technology. The technology therefore does not make it possible to scale parts simply in different sizes. Manufacture with process reliability and with small tolerances is difficult due to the possible distortion in the sintering process.

Other known processes serve the manufacture of milled sensor housings which can be given a visually appealing design. A high shape freedom is present due to the machine processing.

However, the risk of distortion, in particular of thin-walled parts, is higher during milling when the parts to be milled are clamped. In addition, there is a large amount of waste due to the milling process so that the unit costs of the individual sensor housing are higher. The manufacturing costs are also higher because there is high wear of the milling tool in particular with tough, stainless-steel material.

It is the object of the present invention to provide a metallic sensor housing which satisfies the high demands on optoelectronic sensors in the best possible manner and can nevertheless be manufactured inexpensively.

This object is satisfied using a metallic sensor housing for an optoelectronic sensor having the features of claim 1 and using a method of manufacturing a metallic sensor housing having the features of claim 10. Claims 8 and 9 respectively are directed to an optoelectronic sensor and to a light grid respectively having a metallic sensor housing in accordance with the invention.

Dependent claims relate to preferred embodiments and aspects.

A metallic sensor housing in accordance with the invention for an optoelectronic sensor is composed of a plurality of parts. Two or more metallic parts, preferably all metallic parts, of the housing are connected to one another with material continuity. A metallic sensor housing in accordance with the invention can in particular comprise a steel housing, preferably from stainless steel.

The interconnection with material continuity can advantageously be achieved by laser welding, in particular by a heat-conductive welding process.

The connection with material continuity of the metallic parts of the metallic sensor housing in accordance with the invention has the effect that the sensor housing is or acts as "one piece". In this manner, the housing avoids gaps at the edges so that liquid can run off easily and, optionally, high hygienic demands can be satisfied. Extensive reworking of individual housing components is not necessary and the surfaces appear homogeneous.

It is also possible that the housing is easily washable due to the interconnection with material continuity.

If, in accordance with a preferred embodiment, a steel housing, in particular a stainless steel housing, is used, high chemical resistance to acids, lyes or cleaning agents is also ensured, e.g. in the food processing industry. It is not necessary due to the interconnection with material continuity that steel parts have to be joined or bonded to other steel parts so that no dirt-catching joint is present.

A metallic sensor housing in which the interconnection with material continuity is achieved by laser welding also represents an inexpensive form of manufacture.

If the metallic sensor housing comprises parts connected to one another with material continuity by heat-conductive welding, the interconnection with material continuity of the metallic housing parts can be achieved in a particularly simple manner. In the heat-conductive welding process carried out with the aid of a laser, the two steel sheets to be connected are brought to one another. The laser beam melts down the edge of one metal sheet and drives its material toward the second metal sheet so that an interconnection with material continuity is produced. The assembly can no longer be recognized as a combined construction from the outside, optionally after a final fining process.

A heat-conductively welded steel housing has high robustness and resistance capability to thermal demands such as high and fast temperature changes. The welding process also ensures high tightness so that a use underwater and in other liquids is also possible. The housing is gastight at the join sites due to the welding process. The heat-conductive welding process is a manufacturing possibility with process security which allows good reproducibility.

Sensor housings in accordance with the invention can be configured in different sizes and shapes. Cubic, parallelepiped, longitudinally designed housings, housings with free-form surfaces or similar can thus be formed without problem. Fastening sockets, connector stubs or switching units which are of robust and fixed design can be integrated into the housing without joins in a problem-free manner and optionally likewise by a connection with material continuity—e.g.

by laser welding or heat-conductive welding. Optoelectronic modules, front screens, display elements, operating elements and connector technology can be easily integrated into the sensor housing.

Sensor housings in accordance with the invention therefore in particular ensure an economic manufacturing capability and favorable total costs.

The invention further relates to an optoelectronic sensor which comprises an optoelectronic sensor unit which is received in a metallic sensor housing in accordance with the invention, e.g. with a window.

A light grid component is e.g. in particular also called an optoelectronic sensor for the purpose of the present text, with the housing of the light grid being able to comprise a metallic sensor housing in accordance with the invention.

The metallic sensor housing in accordance with the invention can be manufactured easily and inexpensively due to the flexibility in the manufacture and the scaling capability of the housing sizes and shapes so that it can easily be set to the corresponding shapes and sizes of the respective optoelectronic sensor unit to be used.

Other advantages of an optoelectronic sensor in accordance with the invention which comprises a metallic sensor housing in accordance with the invention result from the above descriptions of the advantages of the metallic sensor housing in accordance with the invention.

In a method in accordance with the invention of manufacturing a metallic sensor housing, at least two metallic parts of the housing are connected to one another by laser welding, in particular by heat-conductive welding. A connection with material continuity of the at least two metallic housing parts is thereby achieved in a simple manner so that the advantages are achieved which are described above with respect to the metallic sensor housing in accordance with the invention.

In an advantageous aspect of the method in accordance with the invention, the individual parts are spot-welded in advance in order already to attach them to one another and to effectively prevent a slipping during the laser welding process.

Figure 2:
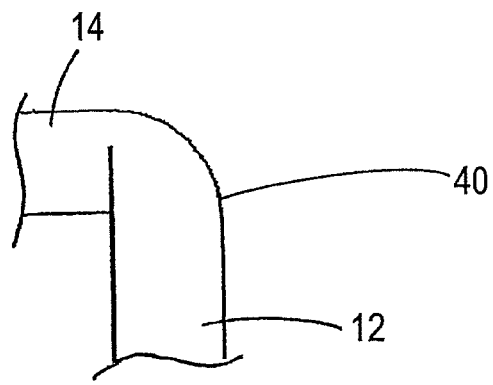
Figure 3A:
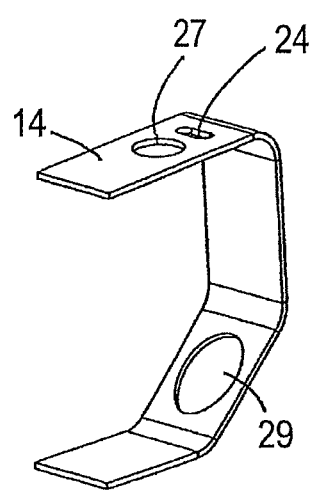
Figure 3B:
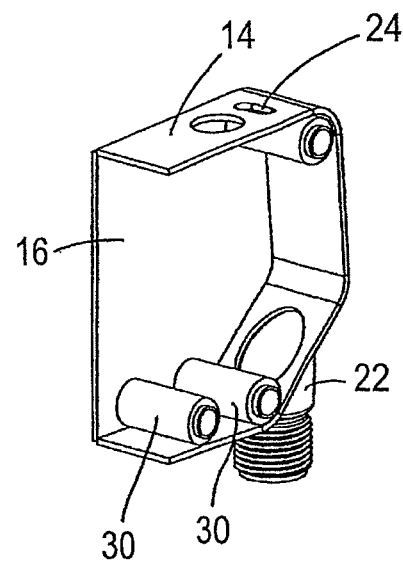
Figure 3C:
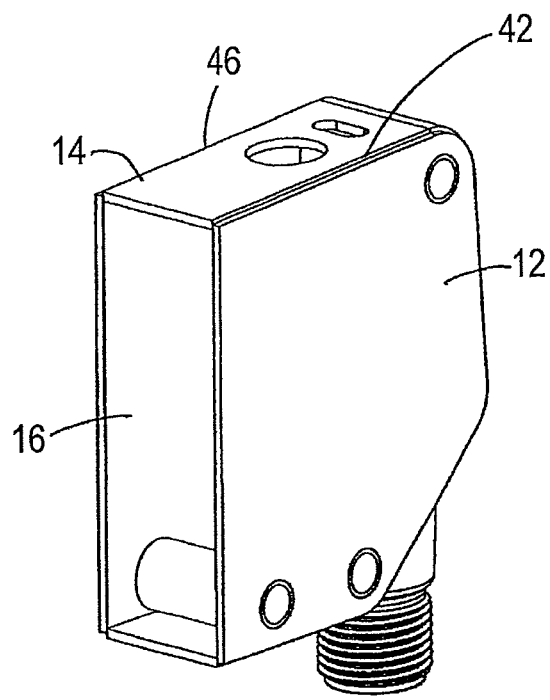
Figure 4:
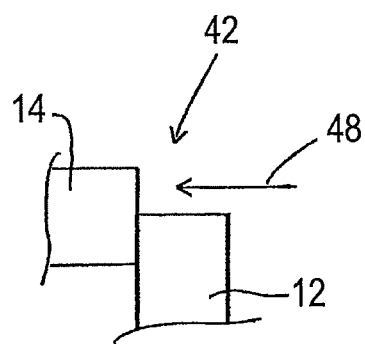
Figure 5:
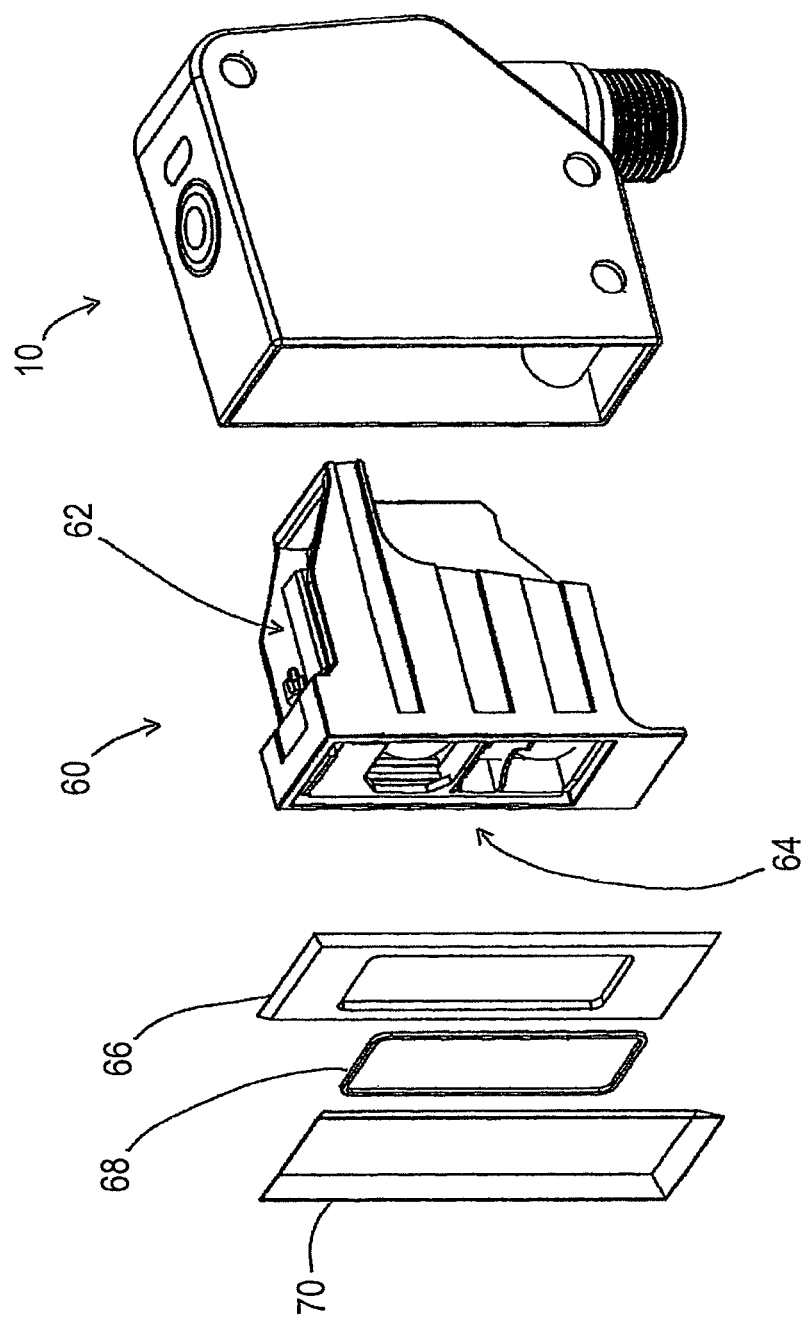
Figure 6:
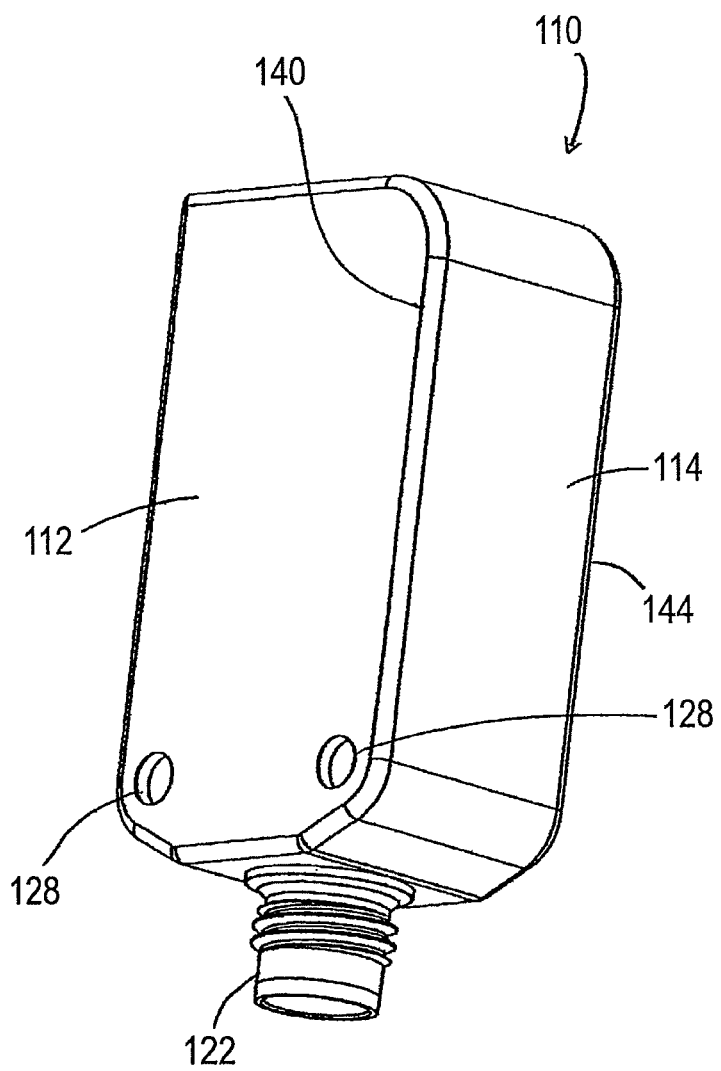

The invention will be presented in detail with reference to the enclosed Figures, the different embodiments of sensor housings or sensors in accordance with the invention and their manufacturing processes. There are shown FIG. 1 an embodiment in accordance with the invention of a metallic sensor housing;

FIG. 2 the cross-section through a seam of a sensor housing of FIG. 1;

FIGS. 3a to 3c different manufacturing steps of the housing of FIG. 1;

FIG. 4 the connection edge of two metallic parts before the welding process in cross-section;

FIG. 5 the structure of an embodiment of an optoelectronic sensor in accordance with the invention in an exploded representation;

FIG. 6 another embodiment of a metallic sensor housing in accordance with the invention;

FIGS. 7a and 7b different views of another embodiment of a metallic sensor housing in accordance with the invention;

FIG. 7c an exploded representation of the housing of FIGS. 7a and 7b;

FIG. 7d an exploded representation of an optoelectronic sensor in accordance with the invention with a housing of FIGS. 7a to 7c;

FIGS. 8a to c components of another embodiment of an optoelectronic sensor in accordance with the invention; and FIG. 9 the optoelectronic sensor of FIG. 8 in the assembled state.

FIG. 1 shows an embodiment of an optoelectronic sensor housing 10 in accordance with the invention made of stainless steel ("INOX"). It comprises a steel side wall 12 and a steel jacket wall 14 which forms the short sides of the sensor housing. A further steel wall is disposed opposite the wall 12. The sensor housing is shaped such that it has a front opening 20 which can e.g. be closed by a screen and through which an optical measurement can be carried out.

A connector stub (or a connector/fastening stub) 22 is located at the lower side of the housing; it has a screw thread for fastening the sensor and serves for the leading through of supply lines or measuring lines.

Reference numeral 24 designates an opening for a display unit. Reference numeral 26 designates a sensing membrane which is inserted into the hosing 10 and which allows the actuation of a switch disposed thereunder. 28 designates openings which are each continued within the housing in a pipe 30 which connects the side wall 12 and the oppositely disposed side wall to one another. These pipes allow a fastening through the openings 28. The openings 28 and pipes 30 can, however, in particular also be omitted in sensors for the hygienic sector, but also in other cases, and another fastening possibility may optionally be provided.

The side wall 12, the jacket wall 14 and the side wall of the sensor housing 10 disposed opposite the side wall 12 have been connected to one another with the aid of a laser welding process.

The seam 40 arising in this process is shown in FIG. 2 in a perpendicular cross-section. The direction of gaze therefore corresponds to the longitudinal extent of the seam. The seam 40 has a round outer contour and has an effect such that the housing looks "in one piece" at this point.

Such a sensor housing in accordance with the invention is manufactured as follows, as is shown in FIGS. 3a to 3c.

The jacket wall 14 is first cut or stamped out of stainless steel and bent into the shape shown in FIG. 3a. In this respect, it has already stamped or drilled holes 24, 27 and 29. The hole 27 serves as a switch opening which in the final form is covered by the sensing membrane 26 to allow the actuation of a switch disposed thereunder. The opening 24 e.g. serves for receiving a display element. The opening 29 serves for the later fastening of the connector stub 22. The jacket wall 14 is therefore a bent stamped part.

A connector stub 22 and a side wall 16 are fastened to the jacket wall 14, as is shown in FIG. 3b. The side wall 16 can e.g. be stamped or laser cut. Optionally, the side wall 16 and the connector stub 22 can be attached by simple spot-welding processes so that they are secure against slipping. Pipes 30, which can later serve as fastening sockets, are placed into the sensor housing already half-present in this manner.

As is shown in FIG. 3c, a side wall 12 is then placed on and optimally attached to the edge 42 by spot welding.

FIG. 4 shows the edge 42 in this state. It can be seen that the sheet metal parts 12 and 14 contact one another to form an edge. 48 roughly designates the direction of a laser beam which is then used in the following heat-conductive welding process for the joining with material continuity of the components 12, 14 of the edge 42. The laser beam 48 melts the edge of the metal sheet 12 in the direction of the metal sheet 14 and drives the material of the metal sheet 12 in the direction of the metal sheet 14. An interconnection with material continuity arises from the two individual metal sheets 12 and 14 which has a uniform outer radius, as can be recognized in FIG. 2. A structure having a homogeneous surface is produced which is no longer recognizable from the outside as a combined construction. As a rule, it is no longer necessary to carry out a post-grinding process. Ideal surfaces with respect to design demands and/or hygienic demands can now be achieved, however, e.g. by a final etching or glass bead blasting or sandblasting.

In particular the seam 42 between the jacket wall 14 and the side wall 12, the seam 46 between the jacket wall 14 and the side wall 16 and the seam between the connector stub 22 and the jacket wall 14 can advantageously be produced in this manner.

FIG. 5 shows how the optoelectronic sensor element 60 is inserted into the sensor housing 10 completed in this manner. It can in this respect e.g. be a unit which is used in a light barrier. For this purpose, it has transmitter and receiver elements 64 known per se which are here only indicated by the front opening. Electrical connectors 62 and/or switch units which can e.g. be switched by the sensing membrane 26 are located in the rear part of the optoelectronic sensor element 60. After the optoelectronic sensor element 60 is pushed into the sensor housing 10 in accordance with the invention, it can be terminated by a cover frame 66. Finally, the sensor housing is provided with a front screen 70, for which purpose, optionally, an intermediate frame 68 can be provided as an adhesive collar or adhesive barrier for the front screen adhesion.

Another embodiment 110 having a different shape is shown in FIG. 6. The jacket wall 114 is here connected to the side wall 112 with material continuity via a heat-conductive welding process. In the same way, the side wall disposed opposite the wall is connected at the edge 144 to the jacket wall 114 with material continuity. The housing 110 has a connector stub (or connector/fastening stub) 122 in the lower region. 128 in turn designates holes for fastening leadthroughs similar to the fastening leadthroughs 28 of the embodiment of FIG. 1.

An embodiment is shown as a round sensor in FIGS. 7a to 7d. The housing 210 is here designed in cylindrical form as an extruded section. A terminal plate 216 is welded to an edge 240 at the one side of the cylinder jacket, with a heat-conductive laser welding process being used. The edge 240 thus has material continuity in the described manner. The connector stub (or connector/fastening stub) 222 is welded into the terminal plate 216. The housing opening 220 is located opposite the terminal plate 216.

The assembly of the optoelectronic module 260 can be recognized in FIG. 7d. The transmitter and receiver are here shown schematically and are designated by the reference numeral 264. An electrical connector plug bears the reference numeral 262. The transmitter, receiver and electrical connectors are located in the optoelectronic module 260 which is pushed into the housing 210 and can be contacted through the connector stubs 222. The optoelectronic sensor element 260 here shows by way of example lens elements 262 in the front region. The round sensor is terminated by the front screen 270.

FIGS. 8 and 9 show an aspect of a light grid 300 having a sensor housing 310 in accordance with the invention.

The light grid housing 310 in accordance with the invention has heat-conductively welded edges 340, 344 for connecting the side wall 312 to the rear wall, not visible here, and the terminal plate 316 to the rear wall and to the side surface 312. In a similar manner, the side wall disposed opposite the side wall 312 is connected to the rear wall and to the terminal plate 316. Connector/fastening stubs 322 are inserted, likewise by heat-conductive welding processes, in the terminal plate 316 and the oppositely disposed terminal plate, which are also fastened to the contacting walls by heat-conductive welding processes. The named edges between the rear wall and the side walls and the insertion edges of the connector/fastening stubs 322 in the terminal plates 316 are homogeneous and have a one-piece effect due to the use of the heat-conductive welding process.

The optoelectronic sensor unit 300 which has transmitter and receiver units 364 for the light grid application is inserted into this housing formed in this manner. Subsequently, the housing opening 320 of the sensor housing is terminated by a frame 368 which bears a front screen. The finished light grid unit 300 is produced which is shown in FIG. 9.

If the thermal coefficients of expansion of the front screen material (e.g. plastic) and of the stainless steel housing are large, the front screen can also be designed in multiple parts to avoid large stresses.

In the component of a light grid 300 shown in FIG. 9, the connector/fastening stubs 322 can be used as connector stubs for the feeds of supply lines and/or signal lines. Other applications provide that the connector/fastening stubs are used for fastening the light grid component. One of the connector/fastening stubs can thus also be designed, for example, for leading through the lines, whereas both connector/fastening stubs 322 are provided for fastening the component to a wall, for example. In such a case, it is not necessary, for example, that the second stub is also designed for leading through lines.

The invention makes possible in a simple manner the manufacture of stainless steel housings having a high surface quality and a hygienic and appealing design in an economic manner and with process security. It is possible in a simple manner to implement a scalable system in the manner of a construction kit.

Since a sheet metal which has e.g. been rolled can be used as the starting material, an extremely high surface quality can be achieved. A positive appearance which practically no longer allows the individual components to be recognized as such is produced by the interconnection with material continuity of the sheet metals using the heat-conductive laser welding process.

REFERENCE NUMERAL LIST

| | |
|---|---|
| 10, 110, 210, 310 | metal housing |
| 12, 112, 312 | side wall |
| 14, 114, 214 | jacket wall |
| 16 | side wall |
| 20, 220, 320 | front opening |
| 22, 122, 222 | support stubs |
| 24 | opening for display element |
| 26 | sensing membrane |
| 27 | switch opening |
| 28, 29, 128 | hole |
| 30 | pipe |
| 40, 140, 240, 340 | heat-conductive welded edge |
| 42 | welding edge before the heat-conductive welding |
| 44, 144, 240, 340 | heat-conductive welded edge |
| 46 | welding edge before the heat-conductive welding |
| 48 | laser beam |
| 60, 260, 360 | optoelectronic sensor unit |
| 62, 262 | electrical connector |
| 64, 264, 364 | transmitter and receiver |
| 66 | cover frame |
| 68 | intermediate frame/adhesive collar or adhesive barrier |
| 70, 270 | front screen |
| 214 | jacket |
| 216, 316 | terminal plate |
| 261 | lens elements |
| 300 | light grid |
| 322 | connector/fastening stubs |
| 368 | frame |

The invention claimed is:

1. A method of manufacturing a metallic sensor housing (10, 110, 210, 310) for an optoelectronic sensor which is composed of a plurality of parts, wherein two or more metallic parts of the housing are connected to one another with material continuity, comprising:
   the step of connecting at least two metallic parts of the housing (10, 110, 210, 310) by laser welding, wherein the step of connecting the at least two metallic parts of the housing (10, 110, 210, 310) by laser welding comprises heat-conductive welding; and
   the step of driving material of an edge of a metallic part (12) of the housing melted with the aid of a laser beam in the direction of a second metallic part (14) of the housing with the aid of the laser beam such that an interconnection with material continuity is produced between the two metallic parts (12, 14) having a uniform outer radius.

2. The method in accordance with claim 1, wherein the parts to be welded are spot-welded to one another in a previous step which precedes the laser welding step.

3. A method of manufacturing a metallic sensor housing (10, 110, 210, 310) for an optoelectronic sensor which is composed of a plurality of parts, wherein two or more metallic parts of the housing are connected to one another with material continuity, comprising the step of connecting at least two metallic parts of the housing (10, 110, 210, 310) by laser welding, wherein the parts to be welded are spot-welded to one another in a previous step which precedes the laser welding step.

* * * * *